United States Patent Office 2,776,880
Patented Jan. 8, 1957

2,776,880

STABILIZATION OF NITROCELLULOSE

David S. Bruce and Harold M. Spurlin, Wilmington, Del., assignors to Hercules Powder Company, Wilmington, Del., a corporation of Delaware No Drawing. Application March 28, 1956,
Serial No. 574,385

10 Claims. (Cl. 52—5.1)

This invention relates to the stabilization of nitrocellulose.

Heretofore, practically the entire art of stabilizing nitrocellulose has been directed to the stabilization of the product obtained by nitrating cellulose with a mixed acid composed of nitric and sulfuric acids, and numerous methods are known for stabilizing such nitrocellulose. Where a very high degree of stability is required, as in smokeless powder and propellants, such nitrocellulose, suitably purified, is stabilized by adding substances such as diphenylamine, 2-nitrodiphenylamine, urea, diethyl diphenylurea, dicyandiamide, or the like to the purified nitrocellulose. Diphenylamine has been, and continues to be, the stabilizer of choice, and stability values above 35 minutes in the standard 134.5° C. Heat Stability Test are readily obtainable by incorporating small amounts of diphenylamine into a suitably purified nitrocellulose.

It has been found, however, that nitrocellulose prepared by reacting cellulose with a nitrating mixture containing essentially nitric acid, magnesium nitrate, and water, as set forth in copending application Serial No. 574,388, filed March 28, 1956 by Bennett, Brooks, McMillan and Plunkett, is not suitably stabilized with diphenylamine in the manner that prior art nitrocellulose is stabilized. To illustrate this point, nitrocellulose prepared by reacting cellulose with a nitrating mixture containing essentially nitric acid, magnesium nitrate, and water, in accordance with the procedure set forth in the aforementioned Bennett et al. application, after suitable purification, had a stability in film form of 29 minutes in the standard 134.5° C. Heat Test. Addition of 1% of diphenylamine did not improve the stability of the purified nitrocellulose, for a value of 29 minutes was also obtained for the nitrocellulose containing diphenylamine. On the other hand, nitrocellulose prepared by reacting cellulose with a mixed acid composed of nitric and sulfuric acids, in accordance with prior art practice, after suitable purification, had a stability of 30 minutes. Addition of 1% of diphenylamine raised the stability of the purified nitrocellulose to 47 minutes in the standard 134.5° C. Heat Test.

The principal objects of this invention, therefore, are to provide suitably stabilized compositions of nitrocellulose prepared by reacting cellulose with nitrating mixtures containing essentially nitric acid, magnesium nitrate, and water, and to provide a method for stabilizing such nitrocellulose, the novel features and combinations of the invention being set forth in the appended claims.

Now in accordance with this invention it has been found that nitrocellulose which is the reaction product of cellulose with nitrating mixtures containing essentially nitric acid, magnesium nitrate, and water is stabilized by incorporating with said nitrocellulose from about 0.2% to about 2% by weight of diphenylamine and from about 0.02% to about 1% by weight of acid having a dissociation constant not greater than $2 \times 10^{-2}$, the percentages of said diphenylamine and said acid being based on said nitrocellulose. Stabilized nitrocellulose compositions in accordance with this invention have stability values of 35 minutes or more when tested by the standard 134.5° C. Heat Test as described in ASTM specification D–301–31–T, and are satisfactory for use in smokeless powder, propellants, and other explosive mixtures.

This discovery is indeed surprising in view of the fact that neither diphenylamine alone nor acid alone is effective for stabilizing nitrocellulose obtained by nitrating cellulose with a nitrating mixture containing essentially nitric acid, magnesium nitrate, and water. Moreover, it is well recognized that acids generally have a deleterious effect on the heat stability of nitrocellulose prepared in accordance with customary prior art practice employing a mixed acid composed of nitric and sulfuric acids. This is exemplified by the extreme care which is taken during the manufacture of nitrocellulose to remove acid as completely as possible during purification.

Having set forth the general nature of the invention, the following embodiments are presented in illustration thereof, but these are not to be construed as limiting the invention.

*Example 1*

Two different nitrocelluloses were prepared as follows: (1) One part by weight of dry shredded wood pulp was dipped or immersed in 54 parts by weight of a nitrating mixture, containing 69.73% nitric acid, 18.12% magnesium nitrate, 12.13% water, and 0.02% nitrogen trioxide by weight, and heated to 50° C. The slurry of cellulose in the nitrating mixture was nitrated at about 50° C. for 10 minutes while agitating, after which the slurry of nitrocellulose in spent nitrating mixture was run into a centrifuge. As much as possible of the spent nitrating mixture was separated from the fibrous nitrocellulose by centrifugal force, and the nitrocellulose was then drowned in a large excess of water, about 60 parts water to 1 part nitrocellulose. After draining off the drowning bath, the nitrocellulose was suspended in about 15 parts of water containing about 0.35% by weight of nitric acid, and was boiled until the viscosity of the nitrocellulose was within the range between 8 and 20 seconds as specified in Government specification JAN–N–244, July 31, 1945. The nitrocellulose was then drained, washed free of acid, jordaned to reduce particle size, and again washed to remove traces of acid liberated by jordaning.

This nitrocellulose, having a nitrogen content of 12.57%, was retained for further processing to be described hereinafter.

(2) Another nitrocellulose was prepared substantially as set forth in (1) above except that the nitrating mixture contained 75.20% nitric acid, 15.80% magnesium nitrate, and 9.00% water. This nitrocellulose had a nitrogen content of 13.39%.

The nitrocelluloses prepared in (1) and (2) above were then blended to produce a blended nitrocellulose containing between 13.10% and 13.20% nitrogen, and the blend was dried in a current of warm air at 60° C.

This blended nitrocellulose had a stability value in film form of 29 minutes in the standard 134.5° C. Heat Stability Test.

Separate weighed portions of the dry blended nitrocellulose were dissolved in butyl acetate. To one portion, designated as (a), was added 1% by weight of diphenylamine, based on the nitrocellulose. To another portion, designated as (b), was added 0.05% by weight of tartaric acid, based on the nitrocellulose. To other portions were added, respectively, (c) 1% diphenylamine and 0.2% tartaric acid, (d) 1% diphenylamine and 0.5% citric acid, (e) 1% diphenylamine and 0.2% stearic acid, and (f) 1% diphenylamine and 0.1% phosphoric acid, the percentages in each case being based on the nitrocellulose present. A final portion, designated as (g), of the blended nitrocellulose dissolved in butyl acetate containing neither diphenylamine nor acid was retained for comparison purposes.

For additional comparison purposes a blended nitrocellulose was prepared, purified and blended in accordance with Government specification JAN–N–244, July 31, 1945, employing the usual mixed acids composed of nitric and sulfuric acids. Weighed portions of this blended nitrocellulose, after drying in a current of warm air at 60° C. were similarly dissolved in butyl acetate. To one portion, designated as (h), was added 1% by weight of diphenylamine, based on the nitrocellulose. Another portion, designated as (i), containing no diphenylamine, was retained for comparison purposes.

Films were cast from all solutions, dried at room temperature to remove solvent, and conditioned in an air oven at 60° C. for one hour. Each film was then cut into small fragments and was tested for stability in accordance with the standard 134.5° C. Heat Test, as specified in ASTM–D–301–31–T. The following table summarizes the pertinent data on compositions (a) to (i), inclusive.

| Composition Designation | Nitration Process Employed | Acid Added | Wt. of Acid Added, Percent [3] | Wt. of Diphenylamine Added, Percent [4] | 134.5° C. Heat Stability of Composition (Minutes) |
|---|---|---|---|---|---|
| (a) | (1) | None | | 1 | 29 |
| (b) | (1) | Tartaric | 0.05 | None | 25 |
| (c) | (1) | ___do___ | 0.20 | 1 | 43 |
| (d) | (1) | Citric | 0.50 | 1 | 43 |
| (e) | (1) | Stearic | 0.20 | 1 | 50 |
| (f) | (1) | Phosphoric | 0.10 | 1 | 36 |
| (g) | (1) | None | | None | 29 |
| (h) | (2) | ___do___ | | 1 | 47 |
| (i) | (2) | ___do___ | | None | 30 |

[1] Nitrating mixture containing essentially nitric acid, magnesium nitrate, and water.
[2] Nitrating mixture was customary mixed acid composed of nitric and sulfuric acids.
[3], [4] Weights based on nitrocellulose.

It is apparent from the data in the preceding table that neither diphenylamine alone nor acid alone is capable of stabilizing nitrocellulose produced by nitrating cellulose with a nitrating mixture containing essentially nitric acid, magnesium nitrate, and water. On the other hand, such nitrocellulose containing both diphenylamine and acid in accordance with this invention is stabilized to a level where the nitrocellulose fully meets the stability requirements of Government specification JAN–N–244, July 31, 1945, and hence is satisfactory for use in smokeless powder, propellants, and other explosive mixtures.

The compositions of this invention utilize nitrocellulose which is the reaction product of cellulose with nitrating mixtures containing essentially nitric acid, magnesium nitrate, and water as set forth in copending application by Bennett, Brooks, McMillan and Plunkett. According to the above Bennett et al. application suitable nitrating mixtures contain three essential ingredients, namely, nitric acid, magnesium nitrate, and water, the ratio of magnesium nitrate to water being at least about 1.2:1 and not more than about 2.2:1 by weight, preferably between about 1.3:1 and about 2:1, and the nitric acid being present in an amount sufficient to yield a nitric acid ester of cellulose having a nitrogen content of from about 11% to about 13.5% by weight. It will be understood, of course, that the sum of the three essential components will constitute substantially 100% of the nitrating mixture, any $N_2O_3$ being only an incidental ingredient in the nitrating mixture, since it is well recognized that concentrated nitric acid often contains small percentages of $N_2O_3$, usually on the order of 0.1% or less.

Although for most purposes the nitrating mixtures of this invention will usually contain between about 45% and about 94% nitric acid, between about 3.3% and about 34% magnesium nitrate, and between about 2.7% and about 21% water by weight, it is to be understood that the invention is not to be construed as limited in this respect, since the important feature is the ratio of magnesium nitrate to water as set forth hereinabove, nitric acid being present in an amount sufficient to yield a nitric acid ester of cellulose having a nitrogen content of from about 11% to about 13.5% by weight.

A more specific nitrating mixture suitable for preparing most types of nitrocellulose contains essentially between about 45% and about 80% nitric acid, between about 10% and about 34% magnesium nitrate, and between about 7% and about 21% water by weight, the ratio of magnesium nitrate to water being at least about 1.2:1 and not more than about 2.2:1, preferably between about 1.3:1 and about 2:1 by weight. Within these operating limits there are numerous nitrating mixtures for preparing any particular nitrocellulose desired. Likewise, within these operating limits there are nitrating mixtures suitable for preparing substantially all commercial types of nitrocellulose. The particular nitrating mixture employed will therefore, be largely a matter of choice governed primarily by economic and end use considerations, it being apparent that the higher nitrogen-type nitrocelluloses require nitrating mixtures high in nitric acid content and low in water content within the limits set forth.

Nitration may be accomplished by immersing dry cellulose such as shredded cotton linters or wood pulp in a large excess of the nitrating mixture, usually at least about 20 parts per part of cellulose, at a temperature within the range from about 15° C. to about 70° C., preferably about 50° C., and agitating the reaction slurry until nitration is complete and the resulting nitrocellulose is in equilibrium with the spent nitrating mixture, usually about 8 to 10 minutes being sufficient. Following nitration the bulk of spent nitrating mixture is centrifuged off, the nitrocellulose is drowned in water, drained, and purified by washing, after which the nitrocellulose is in condition to be treated as desired by any of the well-known and conventional methods for adjusting viscosity, bleaching, dehydration and the like.

Any nitrocellulose which is the reaction product of cellulose with any nitrating mixture containing essentially nitric acid, magnesium nitrate, and water within the aforestated limits is suitable for the purposes of this invention.

Compositions in accordance with this invention contain diphenylamine in amounts ranging between about 0.2% and about 2% by weight, preferably about 1%, based on the weight of nitrocellulose present in the composition. Amounts less than about 0.2% ordinarily do not impart sufficient stability benefits to the composition. On the other hand, there is little, if any, additional advantage in stability to be gained by employing amounts of diphenylamine in excess of about 2% by weight, and an excessive amount of undesirable dark color is likely to develop upon aging of such compositions. About 1% by weight of diphenylamine based on nitrocellulose weight represents an optimum amount to provide adequate stabilizing benefits with a minimum development of undesirable dark color upon aging.

Compositions in accordance with this invention also contain between about 0.02% and about 1% by weight, based on the nitrocellulose content, of acid having a dissociation constant not greater than about $2 \times 10^{-2}$, and any acid meeting this dissociation constant requirement is suitable. Typical acids include, by way of example, tartaric, citric, stearic, phosphoric, and toluene-sulfonic acid. The acid employed can be a single acid, or a mixture of two or more acids.

The examples illustrate one method of incorporating diphenylamine and acid, by adding them to a solution of the nitrocellulose in a suitable solvent. Another convenient method for incorporating these stabilizing adjuvants to the nitrocellulose involves preparing a solution of diphenylamine and acid in a suitable solvent, such as diethyl ether, and then adding this prepared solution to the fibrous nitrocellulose dehydrated, for example, with ethyl alcohol, followed by mastication or other mechanical working of the mass to distribute the diphenylamine and acid uniformly through the mass. Other conventional means for incorporating the stabilizing adjuvants of this invention with the nitrocellulose will be apparent to those skilled in the art.

This is a continuation-in-part of our copending application, Serial No. 377,236, filed August 28, 1953.

What we claim and desire to protect by Letters Patent is:

1. A composition comprising nitrocellulose which is the reaction product of cellulose with a nitrating mixture containing essentially nitric acid, magnesium nitrate and water, the ratio of magnesium nitrate to water being at least about 1.2:1 and not more than about 2.2:1 and the nitric acid being present in an amount between about 45% and about 94% by weight of said nitrating mixture sufficient to yield a nitrocellulose having a nitrogen content of from about 11% to about 13.5% by weight, from about 0.2% to about 2% by weight of diphenylamine, and from about 0.02% to about 1% by weight of acid having a dissociation constant not greater than about $2 \times 10^{-2}$, the percentages of said diphenylamine and said acid being based on the weight of said nitrocellulose.

2. A composition comprising nitrocellulose which is the reaction product of cellulose with a nitrating mixture containing essentially between about 45% and about 94% nitric acid, between about 3.3% and about 34% magnesium nitrate, and between about 2.7% and about 21% water, the ratio of magnesium nitrate to water being at least about 1.2:1 and not more than about 2.2:1, from about 0.2% and about 2% by weight of diphenylamine, and from about 0.02% to about 1% by weight of acid having a dissociation constant not greater than about $2 \times 10^{-2}$, the percentages of said diphenylamine and said acid being based on the weight of said nitrocellulose.

3. A composition in accordance with claim 2 in which the acid is tartaric acid.

4. A composition in accordance with claim 2 in which the acid is citric acid.

5. A composition in accordance with claim 2 in which the acid is stearic acid.

6. A composition in accordance with claim 2 in which the acid is phosphoric acid.

7. A composition in accordance with claim 2 in which the acid is toluenesulfonic acid.

8. A composition in accordance with claim 2 wherein the nitrocellulose has between about 13.1% and about 13.2% nitrogen by weight.

9. A method of stabilizing nitrocellulose which comprises incorporating from about 0.2% to about 2% by weight of diphenylamine and from about 0.02% to about 1% by weight of acid having a dissociation constant not greater than about $2 \times 10^{-2}$ with nitrocellulose which is the reaction product of cellulose with a nitrating mixture containing essentially between about 45% and about 94% nitric acid, between about 3.3% and about 34% magnesium nitrate, and between about 2.7% and about 21% water by weight, the ratio of magnesium nitrate to water being at least about 1.2:1 and not more than about 2.2:1, the percentages of said diphenylamine and said acid being based on the weight of said nitrocellulose.

10. A composition comprising nitrocellulose which is the reaction product of cellulose with a nitrating mixture containing essentially between about 45% and about 80% nitric acid, between about 10% and about 34% magnesium nitrate, and between about 7% and about 21% water by weight, the ratio of magnesium nitrate to water being at least about 1.2:1 and not more than about 2.2:1, from about 0.2% to about 2% by weight of diphenylamine, and from about 0.02% to about 1% by weight of acid having a dissociation constant not greater than about $2 \times 10^{-2}$, the percentages of said diphenylamine and said acid being based on the weight of said nitrocellulose.

No references cited